United States Patent [19]

Kassai

[11] 4,180,276
[45] Dec. 25, 1979

[54] BACK-TO-FACE REVERSIBLE PUSH HANDLE OF A BABY CARRIAGE

[75] Inventor: Kenzou Kassai, Higashishimizu, Japan

[73] Assignee: Kassai Kabushiki Kaisha, Osaka, Japan

[21] Appl. No.: 792,988

[22] Filed: May 2, 1977

[30] Foreign Application Priority Data

Jun. 23, 1976 [JP] Japan .............................. 51-83355[U]

[51] Int. Cl.² .............................................. B62B 3/02
[52] U.S. Cl. .................................................. 280/47.36
[58] Field of Search ..................... 280/47.36, 649, 650, 280/647

[56] References Cited

U.S. PATENT DOCUMENTS

| 2,226,000 | 12/1940 | Kroll et al. | 280/649 |
| 2,285,700 | 6/1942 | Feldman | 280/649 |
| 3,873,116 | 3/1975 | Perego | 280/650 |
| 3,873,117 | 3/1975 | Perego | 280/650 |

FOREIGN PATENT DOCUMENTS

| 1193576 | 11/1959 | France | 280/47.36 |
| 432762 | 3/1948 | Italy | 280/47.36 |
| 252658 | 1/1948 | Switzerland | 280/47.36 |

Primary Examiner—Joseph F. Peters, Jr.
Assistant Examiner—Norman L. Stack, Jr.
Attorney, Agent, or Firm—Browdy and Neimark

[57] ABSTRACT

A baby carriage frame having a reversible push handle which includes a rear leg and a front leg, the rear leg being pivotally connected to the front leg. The front and rear legs cross each other at the point of pivotal connection. A handle rod is rotatably connected to the front and rear legs at the same location the legs are pivotally connected. A leg and rod supporting member, connected to the handle rod is provided. The supporting member supports the rear leg and the handle rod parallel to one another when the handle rod is positioned parallel to the rear leg, disengages from the rear leg when the handle rod is pivoted toward the top of the front leg, supports the front leg and the handle rod parallel to each other when the handle rod is positioned parallel to said front leg, disengages from the front leg when the handle rod is pivoted toward the top of the rear leg. A turning lock is connected to the leg and rod supporting member, for locking and unlocking the handle rod and rear leg in parallel alignment in the supporting member when the handle rod and the rear leg are in parallel alignment supported by the supporting member. The lock effects the locking and unlocking of the handle rod and the front leg in parallel alignment in the supporting member when the handle rod and the front leg are in parallel alignment and are supported by the leg and rod supporting member.

4 Claims, 5 Drawing Figures

BACK-TO-FACE REVERSIBLE PUSH HANDLE OF A BABY CARRIAGE

BACKGROUND OF THE INVENTION

The present invention relates to a push handle of a baby carriage which can be used in both the forward and backward positions.

Conventionally, there is a variety of forward and backward reversible push handles of baby carriages and one prior art is shown in Japanese Utility Model Publication No. 2455/75. However, the structure of the reversible push handle of the prior art is very complicated and the operation for shifting the position of the push handle is quite troublesome.

BRIEF SUMMARY OF THE INVENTION

Accordingly, it is an object of the present invention to provide a forward to backward reversible push handle for a baby carriage which is very simple and the shifting operation of the push handle is easily executed.

Other and further objects, features and advantages of the invention will appear more fully from the following description.

DETAILED DESCRIPTION OF THE PREFERRED EMBODIMENT

Figure 1:
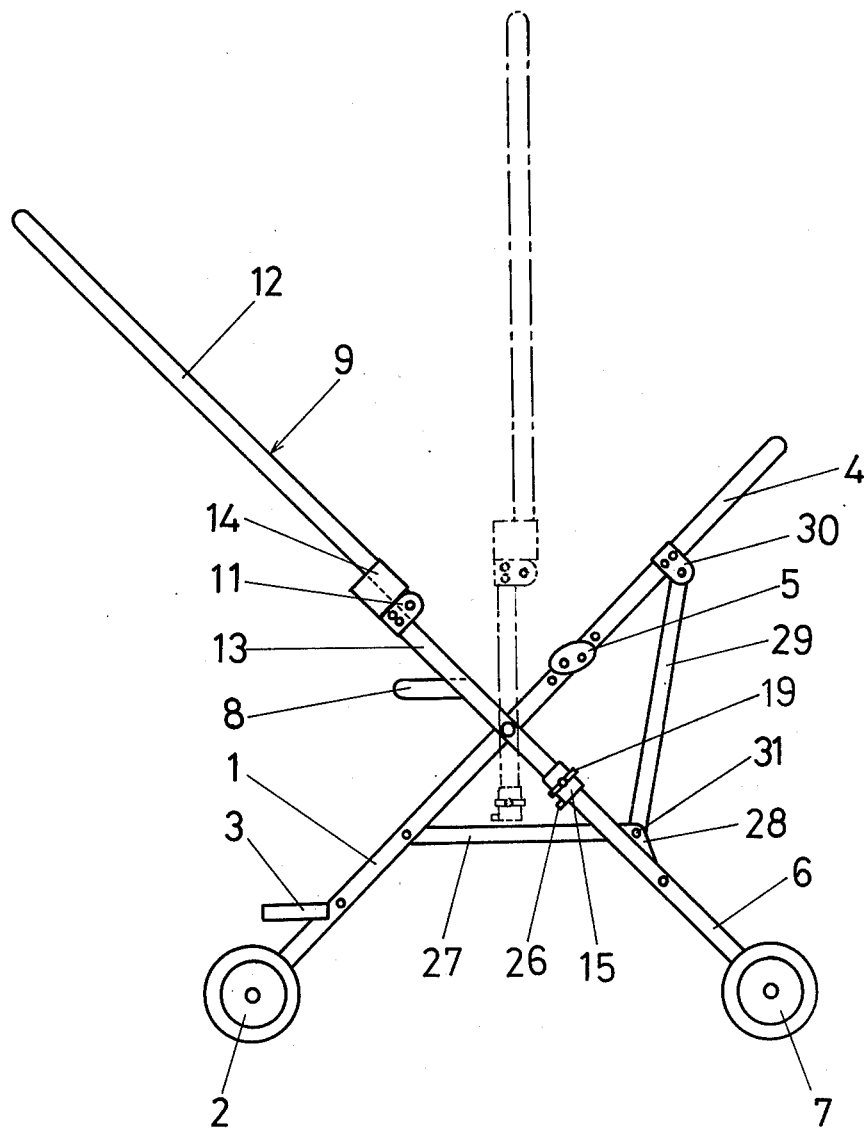
FIG. 1 is a side view of a baby carriage which is provided with one embodiment of a back-to-forward reversible push handle in the forward position according to the present invention.

In FIG. 1, numeral 1 indicates a front leg of rectangular pipe which is provided with a front wheel 2 at the bottom. Numeral 3 indicates a footstool which is provided at the lower portion of the front leg 1. Numeral 4 indicates a supporting rod which is pivotally connected to the top of the front leg 1, by the rotatable joint 5. Numeral 6 indicates a rear leg of rectangular pipe which is pivotally attached crosswise to the front leg 1. Numeral 7 indicates a rear wheel which is provided at the bottom of the rear leg 7. Numeral 8 indicates a elbow rest which is formed by bending the top of the rear leg 6, said elbow rest 8 and said footstools are for a baby who will be seated to look forward in the direction indicated by arrow 40. Numeral 9 indicates a handle rod of rectangular pipe which is pivotally connected to a pivoting point 10 of the front leg 1 and the rear leg 6. Numeral 11 indicates a joint which foldably connects upper rod 12 and lower rod 13 of the handle rod 9. Numeral 9 indicates a slider which is slidably connected to the upper and the lower rods 12, 13, above the joint 11. In the opened state of the baby carriage, the upper rod 12 and the top of the lower rod 13 are inserted through the slider 14 and both rods 12, 13 are held straight. It is possible to fold the upper and lower rods 12, 13 by moving the slider 14 upward to disengage the upper rod 12 from the top of the lower end of rod 13.

Figure 2:
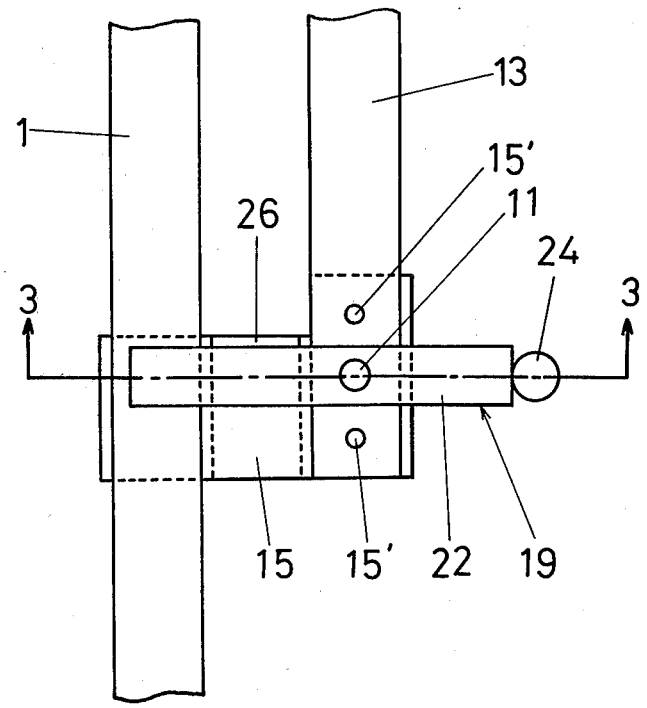
FIG. 2 is a front view of the supporting means of the embodiment in the backward position usage.
Figure 3:
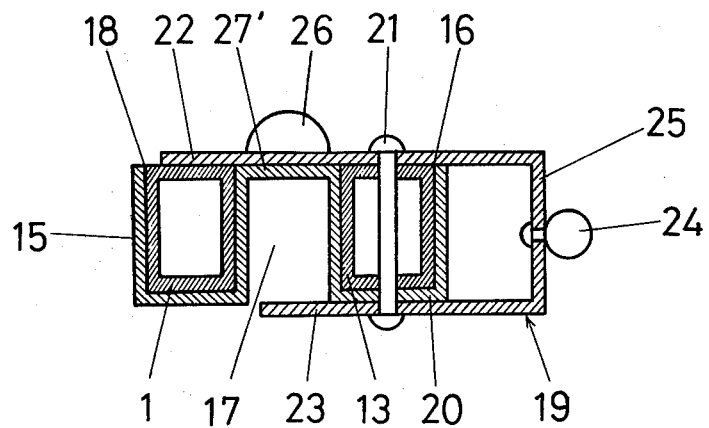
FIG. 3 is a cross sectional view of FIG. 2 in line III—III.
Figure 4:
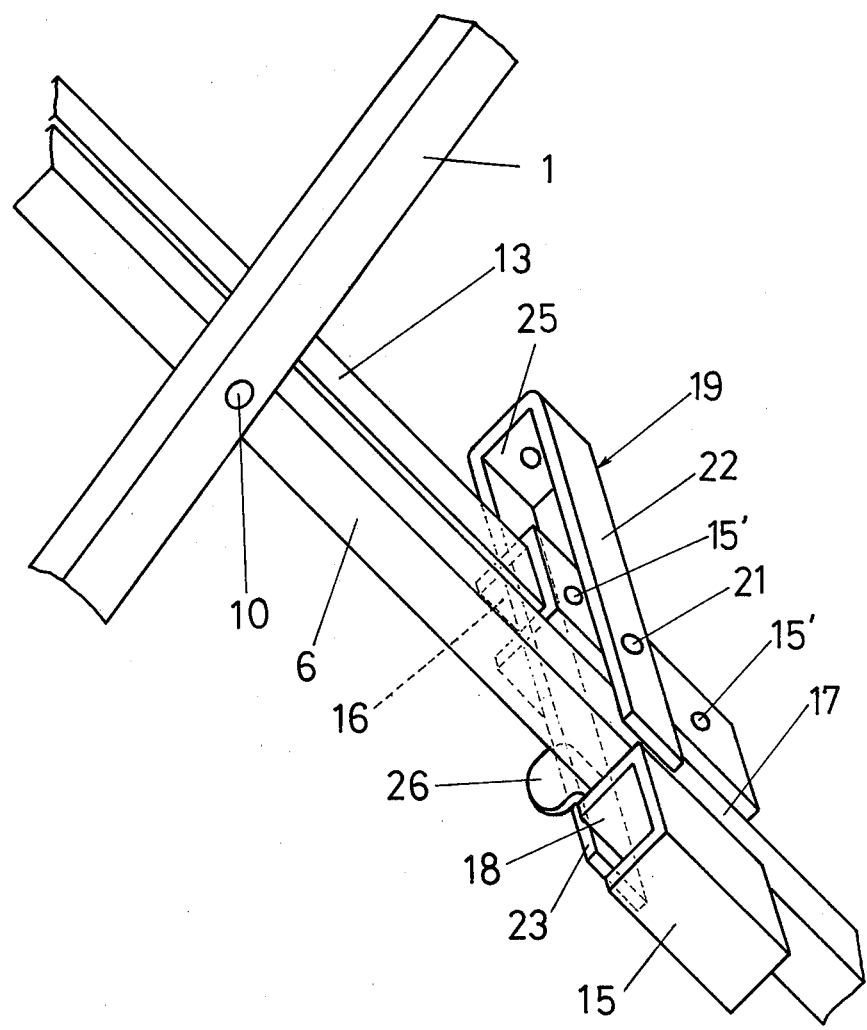
FIG. 4 is a perspective view in part of FIG. 1.

Numeral 15 indicates a supporting member which is fixed to the bottom of the lower rod 13 of the handle rod 9 by pin 15', 15', as shown in FIG. 2. As shown in FIG. 3, the supporting member 15 comprises adjacent parallel, U-shaped portions or compartments, an outside portion 16, a middle portion 17, and an inside portion 18. Portions 16 and 18 each have an opening on the side of the supporting means 15 opposite from the opening of portion 17, direction opposite directions alternately, as best shown in FIG. 3. The supporting member 15 is formed by bending orthogonally a metallic plate six times so that the three portions 16, 17 and 18 are of rectangular section engageable respectively with the lower rod 13 of the handle rod 9, the rear leg 6, and the front leg 1. Numeral 19 indicates an approximately U-shaped turning lock, shown in FIG. 3 which is pivotally connected to the bottom of the lower rod 13 of the handle rod 9 by a pivoting pin 21 inserted into the U-shaped outside portion 16 of the supporting member 15. Rear plate 22 of the turning lock 19 holds the rear leg 6 and the handle rod 9 parallel with each other by extending over the aperture of the middle U-shaped portion 17 of the supporting member 15 into which the rear leg 6 is inserted when the handle rod 9 or push handle is in the forward position, as shown in FIG. 1. Front plate 23 of the turning lock 19 holds the front leg 1 and the handle rod 9 parallel with each other by extending over the aperture of the inside U-shaped portion 18 of the supporting member 15 into which the front leg 1 is inserted when the handle rod 9 or push handle is in the backward position. Numeral 24 indicates a knob which is provided at the center of a bottom plate 25 of the turning lock 19. Numeral 26 indicates a stopper projecting away from the middle portion 17 to restrict the rotation of the front plate 23.

Numeral 27 indicates a first connecting rod one end of which is pivotally connected to the front leg 1. Numeral 28 indicates a second connecting rod one end of which is pivotally connected to the rear leg 6. Numeral 29 indicates a third connecting rod one end of which is pivotally connected to the supporting rod 4 by an attachment 30. Numeral 31 indicates a linding rod which pivotally connects the other ends of the first, second, and third connecting rods 27, 28, and 29 and contacts with the back surface of the rear leg 6.

The shifting operation of the backward-to-forward reversible push handle of the embodiment is described below.

First, consider the push handle or handle rod 9 in the forward position, that is, as indicated by the solid lines at 9 in FIG. 1. In this state, the rear leg 6 is inserted into the middle U-shaped portion 17 of the supporting member 15 and the rear plate 22 of the turning lock 19 extends over the aperture of the middle U-shaped portion 17. At the same time, the front plate 23 is in contact with the stopper 26. The rear leg 6 is held closed in the middle U-shaped portion 17 of the supporting member 15 and the handle rod 9 and the rear leg 6 are held parallel with each other.

To shift the push handle forward from this position to the backward position, the turning lock 19 is rotated with the knob 24 grasped in the hand until the rear plate 22 pushed from the rear leg 6. Thereafter the handle rod 9 is rotated backward in the direction indicated by Numeral 60 in FIG. 1 with the pivoting point 20 of the front leg 1 and the rear leg 6, as a rotation axis as illustrated by the dotted and dashed lines in FIG. 1. Then, the front leg 1 is inserted into the inside U-shaped portion 18 of the supporting member. Thereafter, the turning lock 19 is rotated around the pivoting pin 21 as a rotation axis until the front plate 23 extends over the aperture of the middle portion 18 of the supporting member 15, to hold the front leg 1 and the handle rod 9 parallel with each other.

The shifting operation of the push handle 9 from the backward position to the forward position in the direction of the arrows 50 in FIG. 1 can be similarly executed.

The push handle of the present invention has the following features:

(1) The structure is very simple because the supporting member 15 is fixedly provided at the bottom of the handle rod 9 and it moves with the handle rod 9 to lock the front leg 1 or rear leg 6 making it unnecessary to provide a complicated structure with the front leg 1 or rear leg 6.

(2) The shifting operation of the push handle is very easy due to the simple structure of the handle 9 described above.

(3) It is very easy to push the baby carriage because the push handle 9 is directed in the same direction as the front leg or the rear leg.

(4) The changing of the direction in which the baby carriage travels is usually executed by rotating the push handle 9 after pushing the push handle 9 backward and raising the forward wheels 2 from the ground. This shifting operation can be easily executed because the push handle 9 is directed in the same direction as the front leg 1 or the rear leg 6.

Figure 5:
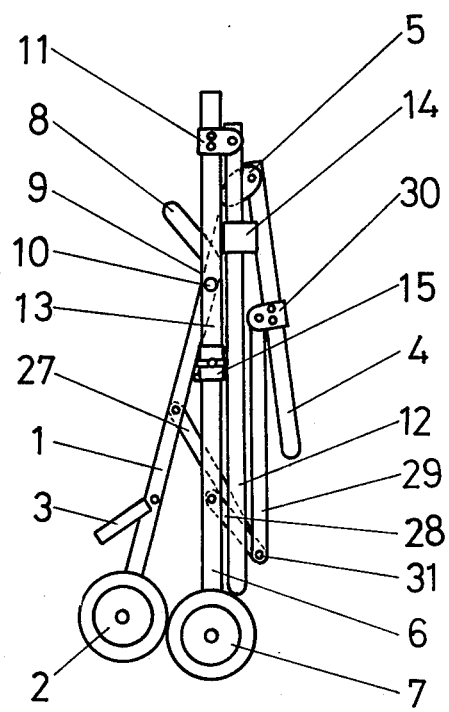
FIG. 5 is a side view of the baby carriage in the folded state.

In addition, the folding and opening operation of the baby carriage of the embodiment is described as follows:

In the folding operation, the slider 14 is slided upwards and the upper rod 12 of the handle rod 9 is folded downwards. Thereafter, a foot is put on the footstool 3 and the elbow rest 8 is pulled up. Then, the front and rear wheels 2 and 7 come close together, the second connecting rod 28 rotates counter-clockwise with the linding rod 31 as its center and pulling down the third connecting rod 29. The third connecting rod 29 rotates the supporting rod 4 backward, and the baby carriage is folded finally as shown in FIG. 5.

In the opening operation, the upper rod 12 of the handle rod 9 is rotated upwards and the upper rod 12 and the lower rod 13 are held straight by the slider 14, and the supporting rod 4 is rotated upward. Then, the third connecting rod 29 rotates the first and second connecting rods 27, 28 upwards and it opens the front leg 1 and the rear leg 6. The baby carriage is opened finally as shown in FIG. 1.

Although the invention has been described in its preferred embodiment with a certain degree of particularity, it will be understood that the present disclosure of the preferred embodiment can be changed in the details of construction and the combination and arrangement of parts may be modified without departing from the spirit and the scope of the invention as hereinafter claimed.

For example, the front leg 1, the rear leg 6, and the handle rod 9 may be of circular pipe and the supporting member 15 may have circular sectional portions engageable with the front leg 1, the rear leg 6, and the handle rod 9 of circular pipes.

I claim:

1. A baby carriage frame with a reversible push handle comprising:
   a front leg;
   a rear leg pivotally connected to said front leg, wherein said front and rear legs cross each other at the point of pivotal connection;
   a handle rod, rotatably connected to said front and rear legs at the same location said front and rear legs are pivotally connected;
   a leg and rod supporting means, connected to said handle rod, for supporting said rear leg and said handle rod parallel to each other when said handle rod is positioned parallel to said rear leg, and for disengaging from said rear leg when said handle rod is pivoted toward the top of said front leg, out of parallel alignment with said rear leg, and for supporting said front leg and said handle rod parallel to each other when said handle rod is positioned parallel to said front leg, and for disengaging from said front leg when said handle rod is pivoted toward the top of said rear leg, out of parallel alignment with said front leg;
   a turning lock means, connected to said leg and rod supporting means, for locking and unlocking said handle rod and rear leg in parallel alignment in said leg and rod supporting means when said handle rod and said rear leg are in parallel alignment supported by said leg and rod supporting means, and for locking and unlocking said handle rod and said front leg in parallel alignment in said leg and rod supporting means when said handle rod and said front leg are in parallel alignment supported by said leg and rod supporting means.

2. A baby carriage frame with a reversible handle, according to claim 1, wherein said leg and rod supporting means comprises:
   adjacent outer, middle and inner compartments of substantially the same depth, adapted to engage, respectively, said front leg, said rear leg and said handle rod therein, said outer, middle and inner compartments each having an opening through which said rear leg, said front leg, and said handle rod respectively must move to engage said supporting means, the opening in said outer and inner compartments being on a side of said leg and rod support means opposite from the opening in said middle compartment.

3. A baby carriage frame with a reversible handle, according to claim 1, wherein said turning lock means comprises:
   a substantially U-shaped plate, one leg of said substantially U-shaped plate being the front plate, the other leg of said substantially U-shaped plate being the rear plate, said front and rear plates being disposed on opposite sides of said supporting means;
   a pivoting pin, penetrating through said front and rear plates, said outside compartment, and said handle rod, wherein said front and rear plates are pivotally connected to said leg and rod supporting means and whereby said front plate can be pivoted to cover the opening in said inner compartment when said front leg engages said inner compartment thereby locking said front leg therein, and whereby said rear plate can be pivoted to cover the opening in said outer compartment when said rear leg engages said outer compartment, thereby locking said rear leg therein.

4. A baby carriage frame with a reversible handle, according to claim 1, wherein said front leg, said rear leg, and said handle rods are rectangular in cross section and wherein said inner, middle and outer compartments of said leg and rod supporting means are U-shaped in cross section.

* * * * *